United States Patent [19]

Delafosse

[11] 4,134,791
[45] Jan. 16, 1979

[54] PLATE-TYPE FUEL ASSEMBLY FOR A NUCLEAR REACTOR

[75] Inventor: Jacques Delafosse, Gif-sur-Yvette, France

[73] Assignee: Commissariat a l'Energie Atomique, Paris, France

[21] Appl. No.: 805,385

[22] Filed: Jun. 10, 1977

[30] Foreign Application Priority Data

Jun. 11, 1976 [FR] France .............................. 76 17750

[51] Int. Cl.² .............................................. G21C 3/30
[52] U.S. Cl. ...................................... 176/75; 176/76; 176/78
[58] Field of Search .............................. 176/75, 76, 78

[56] References Cited

U.S. PATENT DOCUMENTS

| | | | |
|---|---|---|---|
| 2,838,452 | 6/1958 | West et al. | 176/75 X |
| 3,105,807 | 10/1963 | Blake | 176/75 X |
| 3,115,447 | 12/1963 | Stengel | 176/75 |
| 3,124,515 | 3/1964 | Neal | 176/75 |
| 3,321,379 | 5/1967 | Barker et al. | 176/75 |
| 3,322,645 | 5/1967 | Barker et al. | 176/75 |
| 3,586,744 | 6/1971 | Triggiani et al. | 176/75 X |
| 3,923,596 | 12/1975 | Leonard, Jr. | 176/75 |
| 3,933,583 | 1/1976 | Jabsen | 176/78 |
| 4,003,787 | 1/1977 | Marmonier et al. | 176/78 X |
| 4,056,441 | 11/1977 | Marmonier et al. | 176/78 |

Primary Examiner—Peter A. Nelson
Attorney, Agent, or Firm—Sughrue, Rothwell, Mion, Zinn and Macpeak

[57] ABSTRACT

A stack of clad fuel plates disposed vertically in uniformly spaced and parallel relation constitutes the fuel assembly. The fuel plates are connected together in rigidly fixed relation by coupling means extending at right angles to the plane of the fuel plates and mounted at intervals in the vertical direction on the lateral edges of the plates. Hollow sleeves are rigidly fixed to at least a certain number of fuel plates and extend vertically in the plane of these latter, the sleeves being uniformly spaced in the transverse direction of the plates.

14 Claims, 10 Drawing Figures

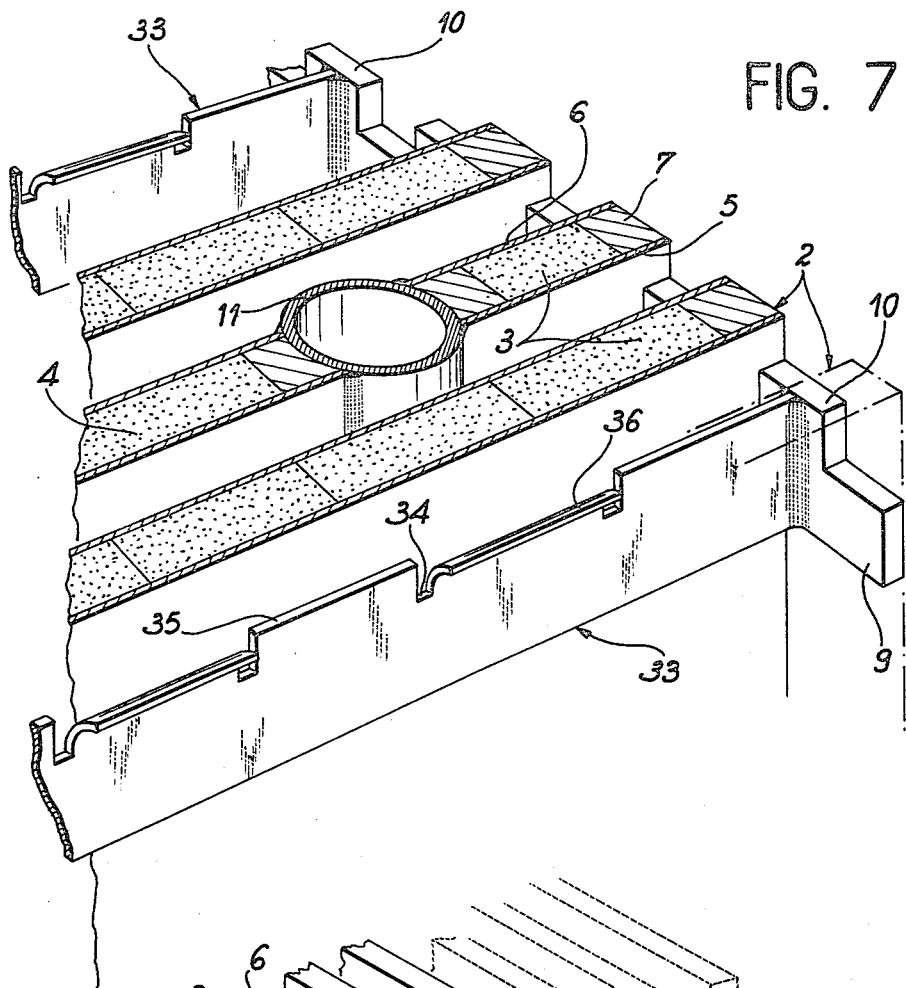
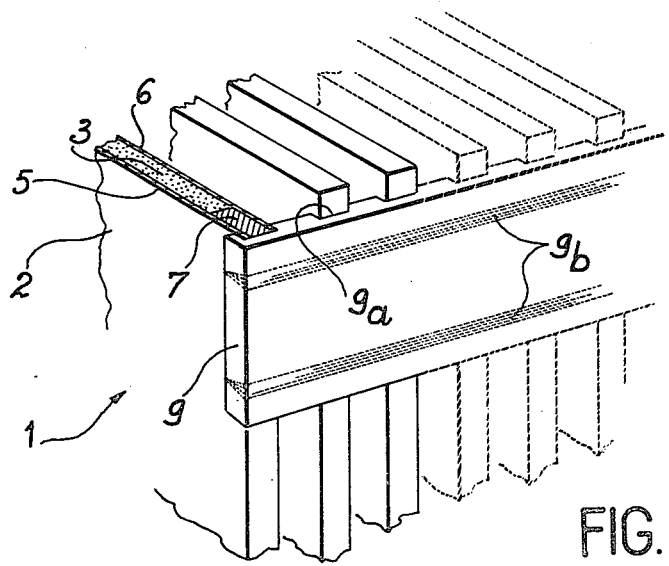

PLATE-TYPE FUEL ASSEMBLY FOR A NUCLEAR REACTOR

This invention relates to a nuclear reactor fuel assembly comprising a stack of parallel fuel plates disposed vertically in uniformly spaced relation and surrounded by cladding. Said fuel plates are joined together and maintained in position with respect to each other by connecting means which extend at right angles to the plane of the fuel plates and are disposed at intervals in the vertical direction on the lateral edges of said plates.

As disclosed in particular in American Patent Application Ser. No. 484,743 of July 1, 1974 fuel assemblies of the type mentioned above are already known. Each clad fuel plate of a fuel assembly is made up of small parallelepipedal plates of fuel material which are formed especially of uranium oxide and each covered with thin metal foil. Said small plates are suitably disposed in spaced relation by means of metallic strips and distributed over the entire surface of the fuel plate to be formed. The complete set of small plates which are each covered with foil is enclosed along the lateral faces of each fuel plate between two metallic cladding sheets which are separated by the thickness of said small plates. By way of alternative, consideration has also been given to the possibility of covering each small plate with a thin metallic strip, in which case the cladding sheets are directly in contact with the uncovered faces of the small plates.

In another patent Application which was filed in France on Oct. 2nd, 1975 under No. 75 30247 in the name of Commissariat a l'Energie Atomique, a different type of fuel assembly made up of a stack of clad plates was also disclosed. The means employed for interconnecting these plates consisted of lateral combs, cross-members or wires which served to connect the parallel fuel plates together so as to constitute a single-unit structure. In this design, provision is made for at least two of these cross-members or the like at the end of the stack in order to be welded or made integral with an end component of parallelepipedal shape which is provided with means for supporting the fuel assembly thus formed. This latter may or may not be associated with a laterally closed outer fuel wrapper, the clad fuel plates being cooled by circulation of a fluid which usually consists of water and flows under pressure in contact with said fuel plates within the wrapper. In other design solutions which are also known in the technique and generally applicable to clad fuel plates of all types, the plates can be maintained within the fuel wrapper by forming parallel longitudinal grooves in the lateral internal faces of the fuel wrapper so as to permit engagement of said plates in said grooves.

In contradistinction to clad fuel plates, other forms of nuclear reactor fuel assemblies are also known in which the fuel assembly consists of a cluster of fuel pencils of appreciable length and of generally cylindrical shape. These fuel pencils are maintained in parallel relation and disposed on a uniform lattice by means of spacer grids traversed by the fuel pencils and disposed at intervals along the height of these latter. The fuel-pencil cluster rests on a bottom support component and this latter is in turn connected to a top component in parallel relation thereto by means of tubular connecting-members or tie-rods which are located at intervals in the stack at certain nodes of the lattice. Said tubular tie-rods are advantageously designed to serve as guides for the rods of neutron-absorbing material which are displaced in sliding motion for controlling neutron flux and making reactivity changes during reactor operation.

As has already been disclosed in American Pat. No. 3,954,560 of Dec. 11, 1972 consideration has already been given to a particular solution of this type in which the spacer grids are freely mounted in a floating assembly both with respect to the coupling tie-rods and with respect to the clad fuel pencils. Displacement of said spacer grids is limited by spacing sleeves which are so designed as to provide a suitable clearance space between said grids and also between these latter and the end components of the fuel assembly.

The aim of the present invention is to make an improvement in plate-type fuel assemblies for nuclear reactors. The primary objective of this improvement is to give these fuel assemblies a general shape which is similar to that of a fuel-pencil assembly of the type recalled above, especially in regard to the external contour of said assemblies. Within a reactor core formed by the side-by-side arrangement of fuel assemblies of a first type such as fuel-pencil assemblies, plate-type assemblies can accordingly be substituted for one or a number or even all these latter if necessary without having to modify the environment and structures of the reactor core. In particular, the invention is intended to permit the substitution mentioned above while permitting adaptation of the plate-type assemblies employed to the mechanical means adopted for handling fuel-pencil assemblies and while also permitting accommodation of the reactivity control systems which are designed and employed for these latter.

A further aim of the invention is to ensure substantially uniform cooling of the reactor core assemblies while making it possible, especially in the event that a plate-type assembly is placed next to a pencil-type assembly, to prevent any unbalance in the flow of coolant as a result of the different structures of these two types of fuel assembly.

The plate-type fuel assembly under consideration is accordingly distinguished by the fact that at least a number of plates of the fuel stack are provided with hollow sleeves which are rigidly fixed to the fuel plates and extend vertically in the plane of said plates, said sleeves being uniformly spaced in the transverse direction of said plates.

In a first embodiment of the invention, the sleeves which are rigidly fixed to the fuel plates have a longitudinal dimension which exceeds that of the fuel plates and are secured at the ends thereof to two support components of the fuel assembly.

In another alternative embodiment, tubular tie-rods are capable of passing freely through the sleeves which are rigidly fixed to the fuel plates and are greater in length than said plates, said tie-rods being secured to the support components.

In either of the two particular embodiments of the invention for producing in one case a single-unit structure in which the fuel plates are rigidly fixed to the sleeves and for producing in the other case a floating assembly in which the fuel plates are permitted to slide with respect to the tubular tie-rods, at least a certain number of the sleeves or tubular tie-rods serve to guide the reactor control rods of neutron-absorbing material as said control rods are displaced in sliding motion within the fuel assembly.

In accordance with a particular feature, the means for interconnecting the fuel plates of the stack are constituted by combs having teeth which are flush-mounted in the cladding of said fuel plates or by transverse rods which are welded to the edges of said fuel plates.

In accordance with another distinctive feature, the parallel fuel plates of the stack are braced with respect to each other by means of transverse spacers located at right angles to the plane of the fuel plates and distributed over the surface of said plates.

As an advantageous feature, the transverse spacers are constituted by flat lugs having a width equal to the spacing between two fuel plates, said flat lugs being joined together in pairs by means of cylindrical connecting portions having a length equal to the thickness of the fuel plates. Preferably, the transverse spacers tranverse the fuel plates through elongated slots formed in said plates in a zone which does not contain fuel and are positioned by means of a movement of rotation through an angle of 90° in order to bring the plane of the spacing lugs into position at right angles to the direction of the elongated slots.

In accordance with another alternative embodiment, the hollow sleeves extend in a single piece to the full height of the fuel plates or else are constituted by spaced tubular elements located in the line of extension of each other. As an advantageous feature, the hollow sleeves project from the contour of the fuel plates at that end of these latter which is located opposite to the bottom support component so as to form a given spacing between said component and said fuel plates.

In the particular case in which the plate-type fuel assembly is intended to be placed within the reactor in the vicinity of at least one assembly of parallel fuel pencils, the means for interconnecting the fuel plates are provided with extensions in the form of lateral sheet-metal strips of small thickness applied against the edges of the fuel plates in order to limit the flow of coolant which penetrates between said fuel plates through the sides of the fuel assembly. Moreover, the stack of fuel plates is provided with means for inducing turbulence in the flow between the fuel plates, said means being such as to comprise thin metallic cross-strips which are parallel to the fuel plates or which have a wavy shape.

In accordance with a distinctive feature, the thin metallic cross-strips have at least one cut-out edge, the portions of strips thus formed being folded-back in one direction and in the other or in one direction alone.

Further distinctive features of a plate-type fuel assembly as constructed in accordance with the invention will become apparent from the following description in which a number of exemplified embodiments of an assembly of this type are given by way of indication and not in any limiting sense, reference being had to the accompanying drawings, wherein:

FIG. 1a illustrates an alternative form of a detail of the fuel assembly in accordance with FIG. 1;

Figure 5:
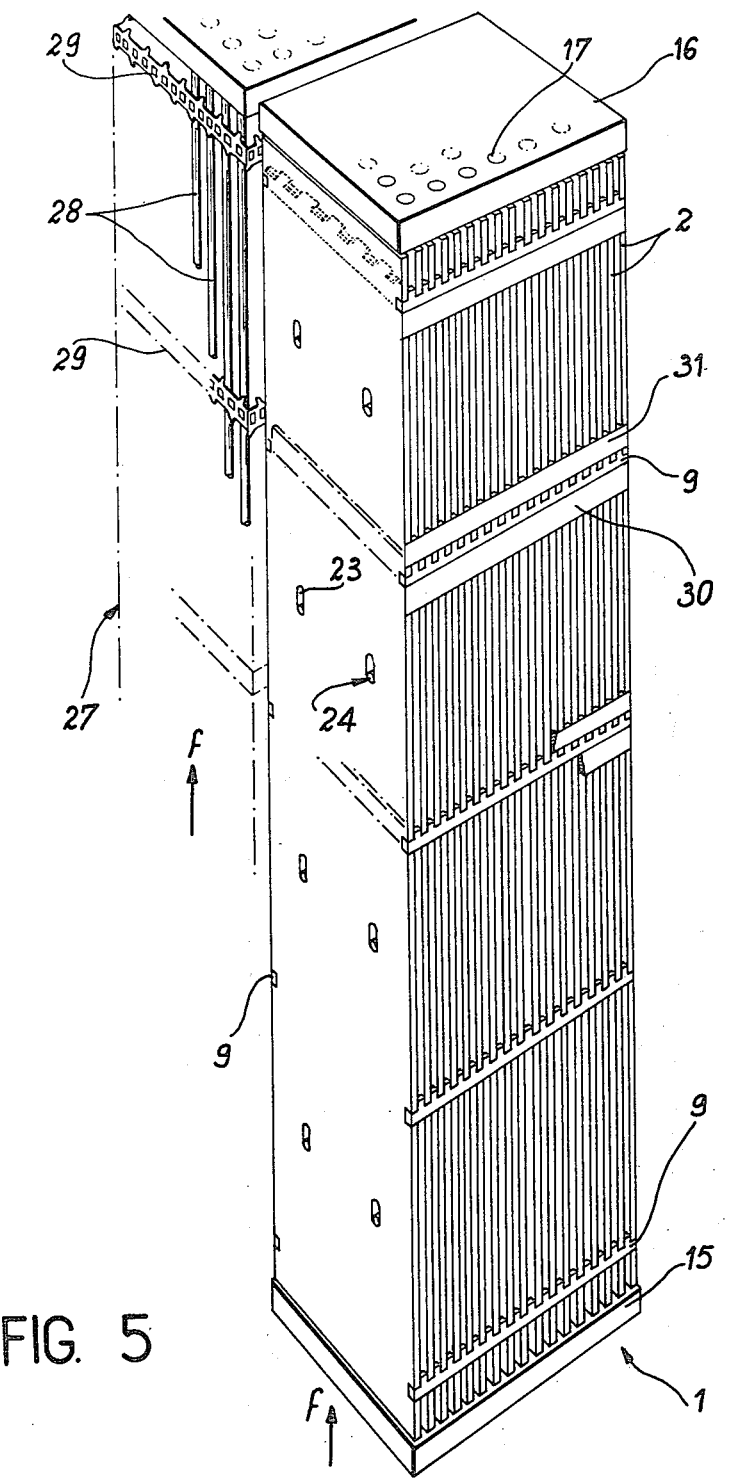
FIG. 5 is a view in perspective to a smaller scale showing a plate-type fuel assembly which is mounted within a reactor core in adjacent relation to a fuel assembly of the cylindrical pencil type.
Figure 6:
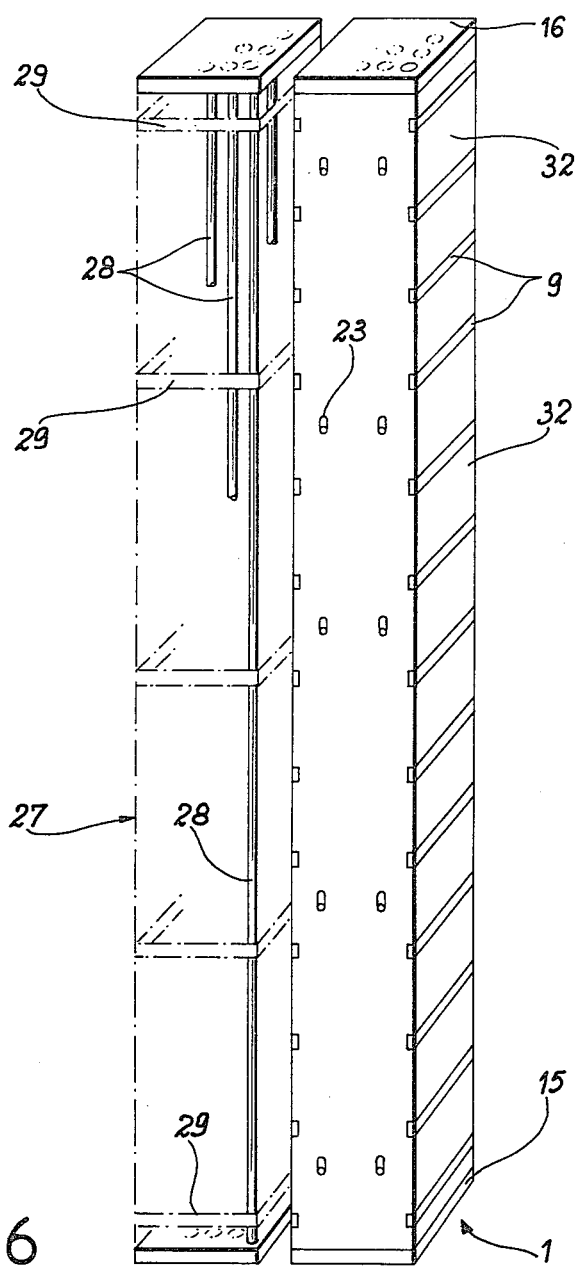
Figure 8:
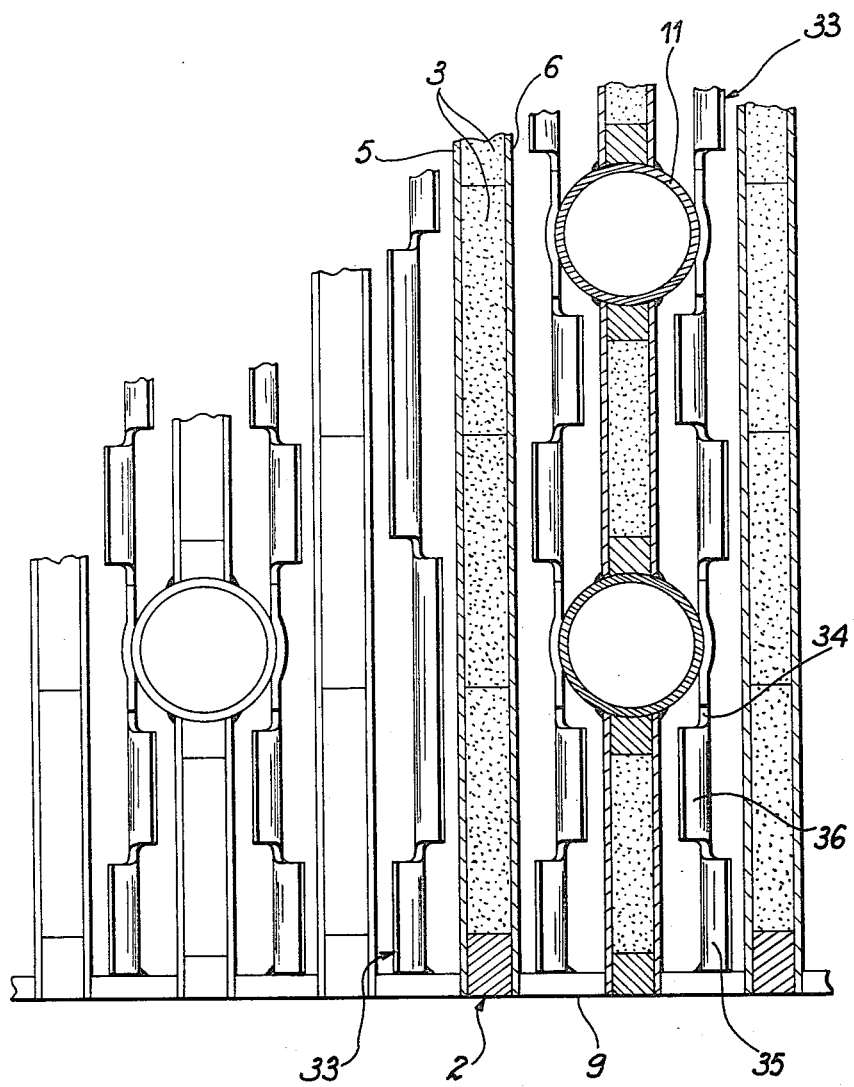
Figure 9:
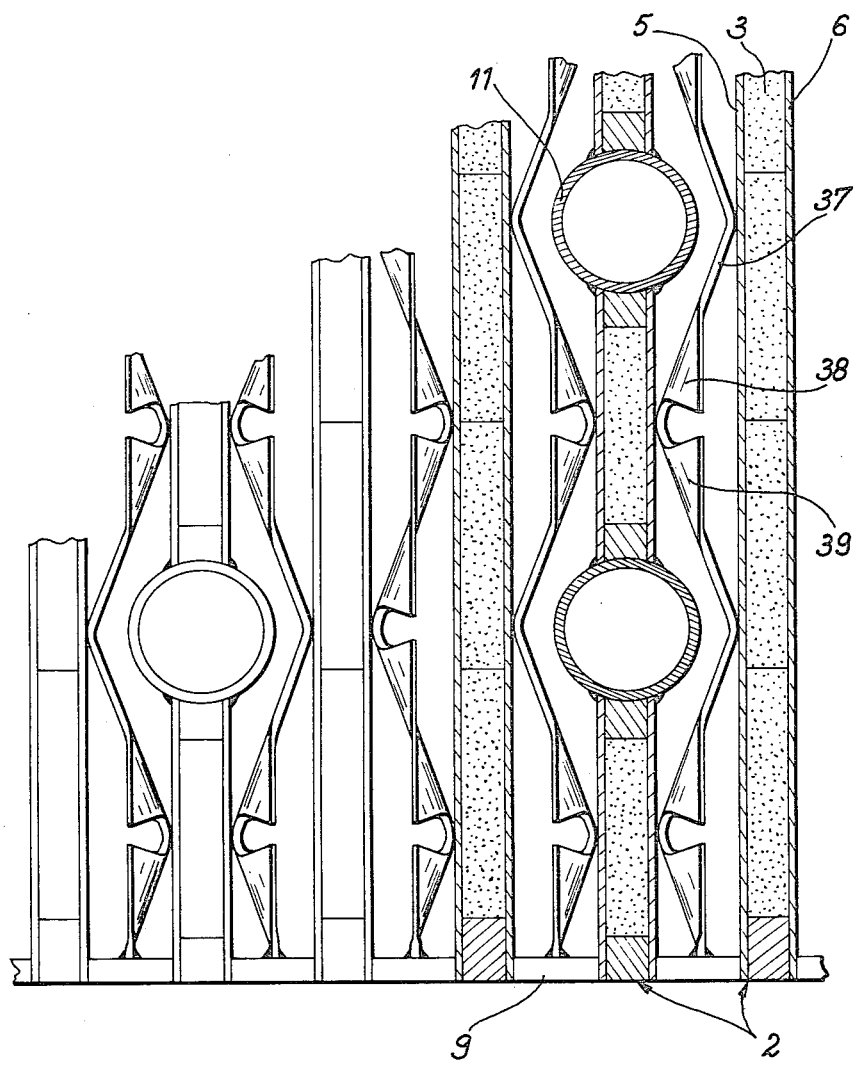

FIG. 6 relates to an alternative form of construction of a plate-type fuel assembly as illustrated in FIG. 5;

FIG. 7 is a part-sectional view in perspective showing another constructional detail of the assembly under consideration and illustrating a first form of construction of means which are mounted within said fuel assembly in order to induce adapted turbulence in the flow of coolant which circulates between the fuel plates;

FIGS. 8 and 9 are views in partial transverse section showing two further alternative forms of construction of the means illustrated in FIG. 7.

Figure 1:
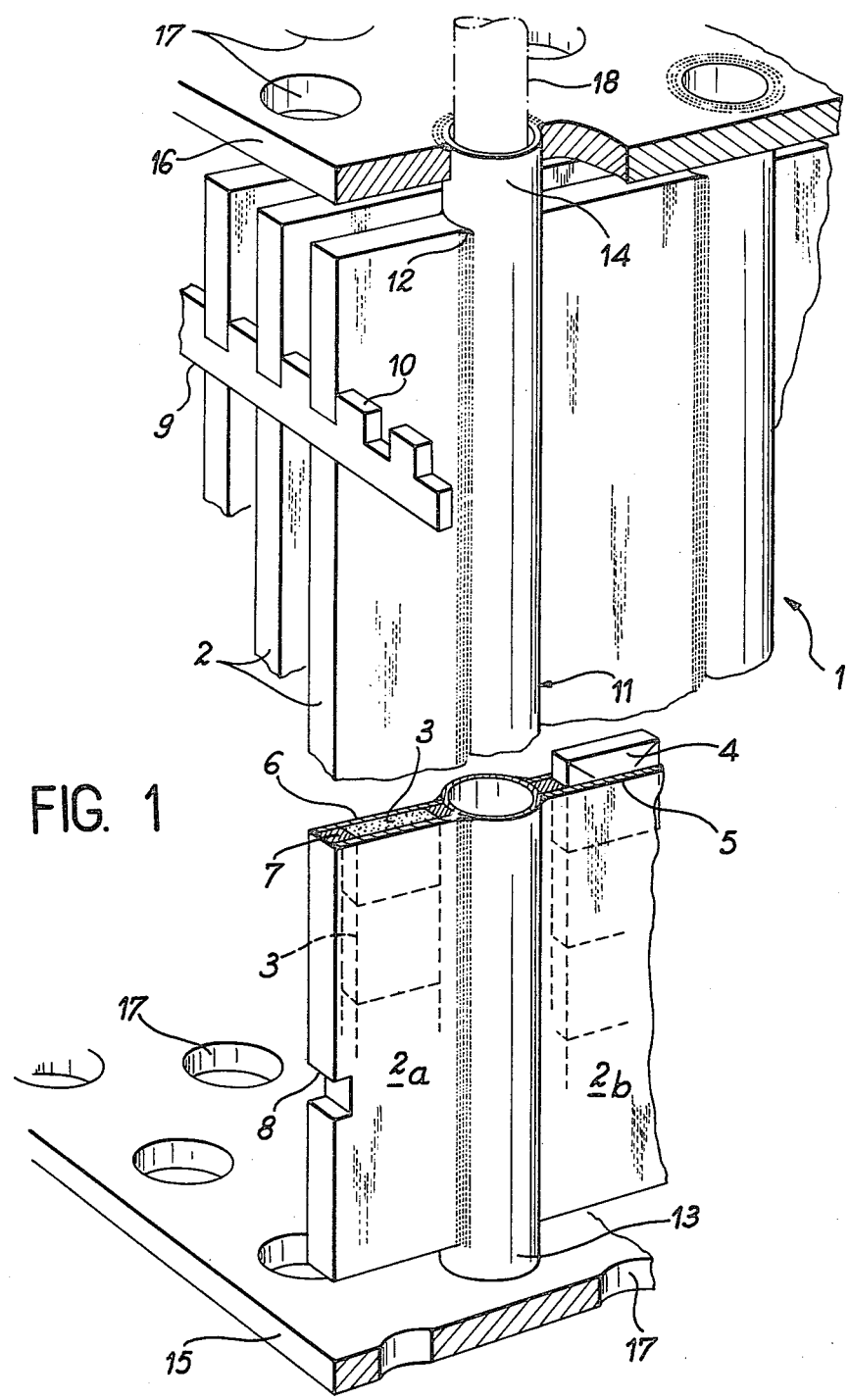
FIG. 1 is a diagrammatic part-sectional view in perspective showing a plate-type fuel assembly in accordance with a first embodiment of the invention.

The plate-type nuclear reactor fuel assembly shown in FIG. 1 is generally designated by the reference 1. This fuel assembly is mainly composed of a stack of parallel and vertical plates 2 containing in a manner known per se a series of small plates 3 of nuclear fuel material surrounded by a clad which is formed of thin metal foil 4. Said small plates are first stacked together along the plane of each fuel plate 2, then enclosed between two thin cladding sheets 5 and 6 respectively, said sheets being joined together along their lateral sides by means of metallic strips 7 which are welded to the sheets 5 and 6 in order to form a leak-tight cladding with these latter. These fuel plates 2 are preferably designed in accordance with the above-mentioned arrangements which have already been described and claimed in American Patent Application Ser. No. 484,743 of July 1, 1974.

The stack of fuel plates 2 is maintained in position with a predetermined spacing between the successive parallel plates by forming notches 8 in the lateral strips 7 which close the cladding, said notches being intended to permit the engagement of spacing combs 9, the teeth 10 of which define the spacing between said plates. Combs of this type advantageously correspond to the arrangements described in French patent Application No 75 30247 of Oct. 2nd, 1975, in accordance with any one of the alternative embodiments contemplated in the cited Application.

If so required, the combs 9 which serve to space the fuel plates 2 in the stack can be so arranged that, instead of engaging in notches 8 in order to ensure that they do not project from the apparent contour of the fuel-plate stack, they are more simply mounted on the lateral edges of these latter as illustrated in FIG. 1a; in this case, said combs are designed in the form of substantially rectangular strips having grooves 9a which permit the engagement of the edges of the fuel plates 2 and which are welded against the cladding of these latter by means of weld fillets 9b.

In accordance with the invention, at least a number of the parallel plates of the stack which constitutes the fuel assembly is provided with sleeves 11 which are designed in the form of hollow tubular elements of appreciable length and the height of which is substantially greater than the height of the fuel plates 2 in the exemplified embodiment which is illustrated in FIG. 1. Said sleeves 11 are welded at 12 against portions of fuel plates which are designated respectively by the references 2a and 2b for example, said portions being disposed in the same plane so as to constitute the fuel plate 2. The sleeves thus have two additional lengths 13 and 14 at the top and at the bottom of the fuel assembly. Said additional sleeve lengths are in turn rigidly fixed, especially by welding or any other suitable means of attachment, to two parallel end-pieces 15 and 16 respectively which define the total height of the fuel assembly and make it possible in particular to ensure not only the cohesion of the fuel stack but also the positioning or withdrawal of said fuel assembly in or from the reactor core (not shown). The end-plates 15 and 16 are provided in the usual manner with a series of holes 17 in order to permit the reactor core coolant which usually consists of water under pressure to circulate freely and especially upwards through each fuel assembly. After passing through the bottom end-plate 15, the stream of water then circulates between the fuel plates 2 of the stack, then passes out of the fuel assembly through the top end-plate 16. It is clear from the foregoing that the sleeves 11 thus perform the function of tubular tie-rods between the end-plates 15 and 16. In accordance with a final advantageous arrangement which is known per se, at least a certain number of said sleeves are reserved for the sliding motion and guiding of control rods 18 formed of neutron-absorbing material, said rods being necessary for controlling the neutron flux and making reactivity changes during reactor operation.

In the example of construction hereinabove described, the stack of fuel plates 2, the lateral coupling combs 9 and the tubular sleeves 11 which are incorporated with a certain number of said fuel plates form a single-unit structure in conjunction with the end-plates 15 and 16. In other alternative embodiments illustrated in FIGS. 2 and 3, the complete array of fuel plates 2 of the stack can be freely mounted so as to be capable of "floating" with respect to a rigid structure which ensures cohesion of the assembly, with the result that the fuel plates are capable of withstanding the expansions which take place during operation without being subjected to any particular mechanical stresses. To this end, at least a certain number of fuel plates 2 of the stack are rigidly fixed to guide sleeves 19 which are similar to the support sleeves 11 of the previous example and designed to permit insertion of tubular tie-rods 20, the ends of which project from said sleeves 19. Said tubular tie-rods are in turn secured to the end-plates 15 and 16, especially by welding or other mechanical means. The guide sleeves 19 are advantageously provided on the end edges of the fuel plates 2 with projecting portions 21 and 22 which make it possible in the case of the portion 21 formed at the lower ends of the plates to apply these latter against the end-plate 15. The projecting portion 22 which is provided on the top edge of each fuel plate between a sufficient clearance space between this latter and the end-plate 16 to permit maximum expansion of the fuel plates.

Figure 3:
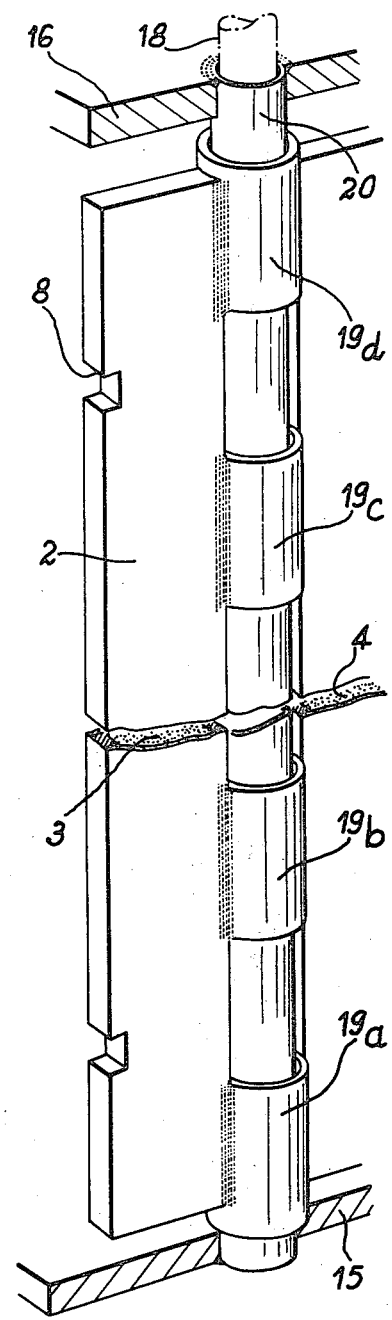

In another alternative embodiment which is illustrated in FIG. 3, the sleeves 19 do not extend to the full length of the corresponding fuel plates 2 but can be subdivided into a plurality of separate sections disposed in the line of extension of each other and designated in the figure by the references 19, 19b, 19c and 19d. As in the previous embodiment, these sections are traversed by tubular tie-rods such as the tie-rod 20 which are rigidly fixed to the end-plates 15 and 16 in order to ensure cohesion of the fuel assembly.

Figure 2:
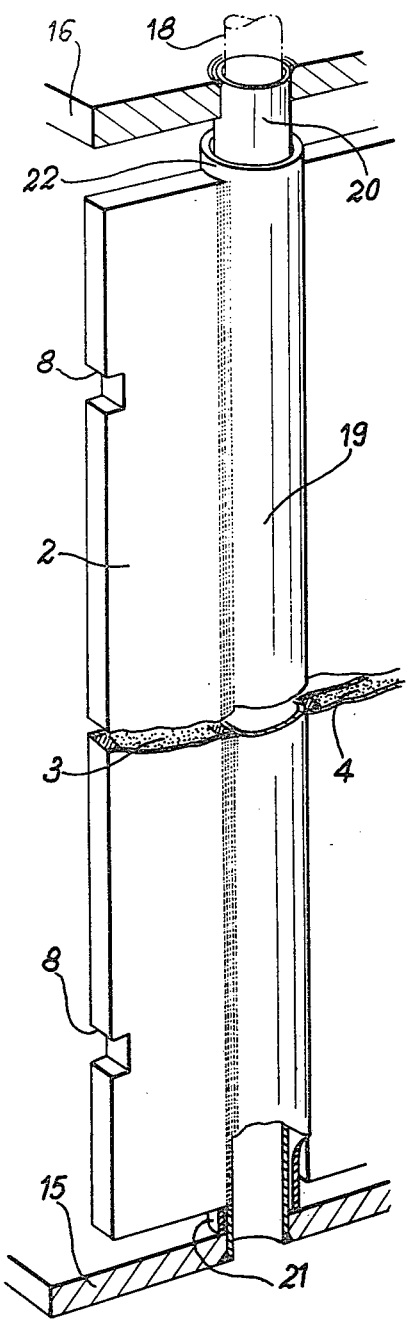
FIGS. 2 and 3 are detail views of two further alternative forms of construction of the fuel assembly under consideration.
Figure 4:
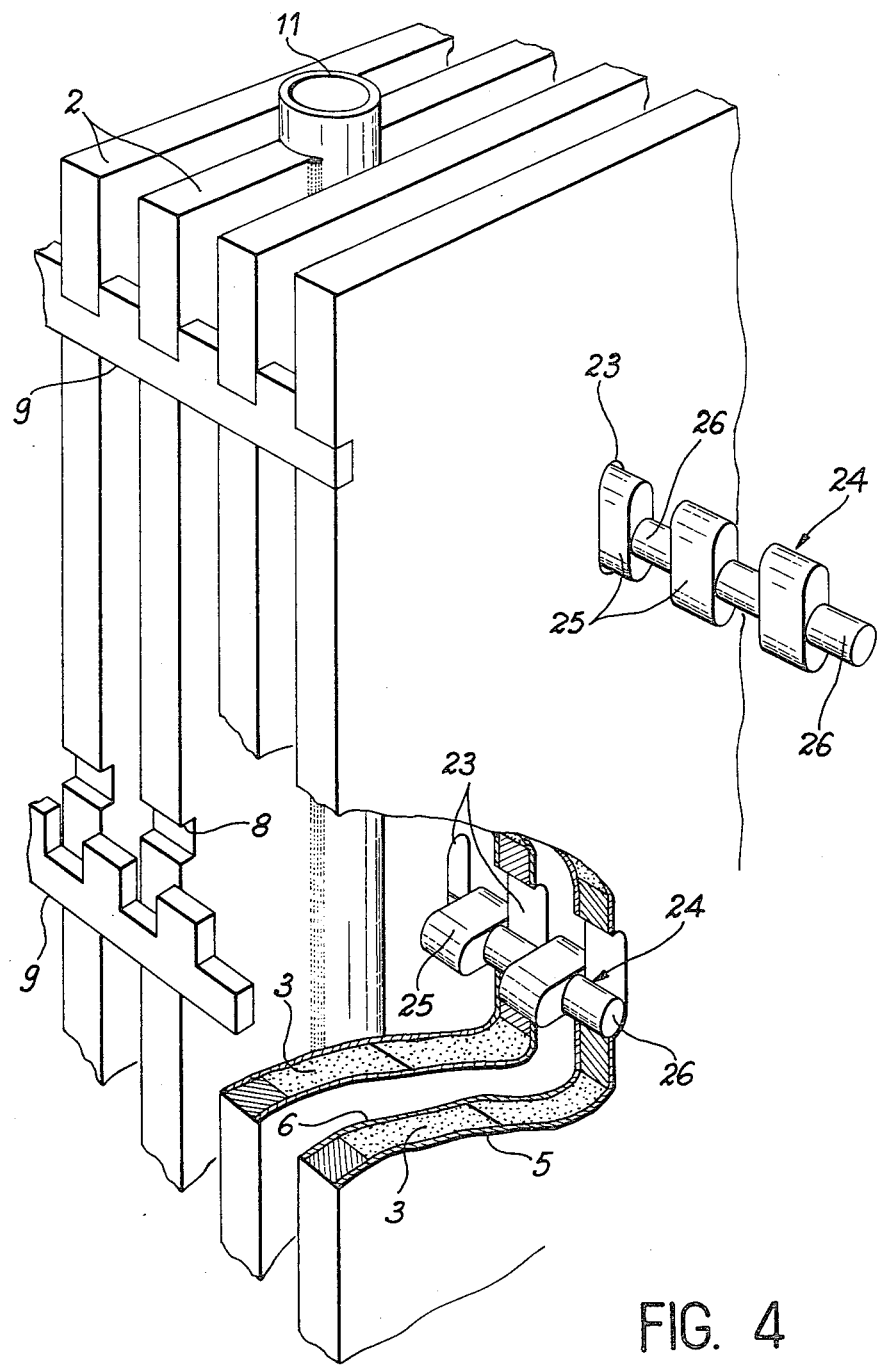
FIG. 4 is another view in perspective showing a portion of the fuel assembly and illustrating in particular the positioning of transverse spacers within the assembly through the stack of fuel plates.

FIG. 4 illustrates a detail improvement made in the construction arrangement of the plate-type fuel assembly in any one of the alternative embodiments shown in FIGS. 1 to 3. This improvement is primarily intended to ensure that the fuel plates 2 are braced in a more effective manner in the stack and particularly in the central region of these latter, especially in order to prevent vibrations or deformations of said fuel plates under the action of the flow of coolant. To this end, the fuel plates 2 of the stack are provided in addition to the lateral combs with elongated slots 23 which are located at intervals in the surface of said fuel plates and oriented either parallel or at right angles to the axial direction of the fuel assembly, especially in zones in which there is no fuel material. Said slots 23 permit the engagement of transverse spacers 24 formed of flat lugs 25 which are joined to each other by means of cylindrical-rod elements 26. The spacing width of said lugs corresponds to the desired distance between the fuel plates whilst the rod elements represent the thickness of the fuel plates themselves. As can be seen from FIG. 4, the special shape of said transverse spacers is such as to permit the insertion of these latter in the stack of fuel plates 2 through the elongated slots 23. Once the spacers have been positioned, they can be rotated through an angle of 90° so as to bring the plane of the spacing lugs 25 in a direction which is substantially perpendicular to that of the slots, with the result that the spacers are locked in position.

As already mentioned in the foregoing, provision is made for special plates between a certain number of clad fuel plates of a given stack. It is recalled that these special plates have tubular sleeves which serve either to maintain a rigidly spaced relationship between the end-plates of the fuel assembly in the vertical direction or to guide hollow tie-rods which perform a similar function, at least a certain number of said tubular sleeves or tie-rods being intended to permit displacement of reactor control rods in sliding motion. By means of this arrangement, conventional fuel assemblies and especially assemblies of the cylindrical fuel-pencil type can accordingly be replaced in a reactor core by fuel assemblies of the plate type mentioned above without entailing any need to modify the other reactor core structures and in particular the fuel-handling means and control-rod drive mechanisms.

In FIG. 5, there have been shown in adjacent relation a fuel assembly 1 comprising fuel plates 2 as described in the foregoing with reference to any one of FIGS. 1 to 3 and a conventional fuel assembly 27 constituted by a cluster of cylindrical fuel pencils 28 which are maintained in position by means of spacer grids 29. In particular, a fuel assembly of this type can be as disclosed and claimed in American Pat. No. 3,954,560 of Dec. 11, 1972 as mentioned earlier.

In such a case it is apparent that the coolant which is usually circulated upwards through said fuel assemblies in the direction of the arrows f flows through these latter at a rate which may not be wholly uniform. In particular, the presence of spacer grids 29 in the fuel-pencil assembly 27 causes outward deflection of the flow of fluid and is consequently liable to result in excessive cooling of the fuel plates 2 of the adjacent fuel assembly 1. It is therefore necessary to overcome this disadvantage and to permit substantially identical cooling of both fuel assemblies. In accordance with a particular arrangement of the invention, the plate-type fuel assembly 1 is accordingly provided with sheet-metal strips of suitable height which are intended to form a screen and are designated respectively by the references 30 and 31. Said strips are preferably welded on the external sides of the fuel assembly 1 in the vicinity of the spacer grids of the adjacent fuel-pencil assembly and against the lateral combs 9.

In another alternative embodiment which is illustrated in FIG. 6, there is again shown a plate-type fuel assembly 1 placed next to a fuel-pencil assembly 27. In this case, the screen plates 32 are joined to the combs 9 in such a manner as to extend over the entire distance between two successive combs within the fuel assembly in order to ensure that the fuel plates 2 are completely isolated from the coolant flow within the other fuel assembly.

Finally, FIGS. 7 to 9 illustrate further arrangements which are advantageously carried into effect in the plate-type assembly under consideration with a view to equalizing the flow between these fuel plates and to ensuring more efficient cooling of this latter. In particular and as illustrated in FIG. 7, the fuel assembly can comprise means for producing turbulence in the fluid flow, these means being constituted by thin metallic cross-strips 33 which extend in a direction parallel to the plane of the fuel plates. Said cross-strips 33 are welded or secured by any suitable mechanical means against the coupling combs 9 which ensure relative spacing and interconnection of the fuel plates 2 of the stack. Vertical slots 34 are formed in at least one edge of each cross-strip and the portions of cross-strips which have thus been cut-out as designated respectively and successively by the references 35 and 36 may or may not be folded-back with respect to the plane of the corresponding cross-strips. In the example illustrated in FIG. 7, the portions 35 thus remain in the plane of said cross-strips whilst the adjacent portions 36 are all bent-back on the same side. On the other hand, in the alternative embodiment which is illustrated in FIG. 8, the successive portions 35 and 36 are all intended to be bent-back alternately on each side of the plane of the cross-strips 23. Finally, in the alternative embodiment illustrated in FIG. 9, the cross-strips which are mounted between the fuel plates of the assembly and designated by the reference 37 have a wavy profile when looking from above, the successive portions 38 and 39 formed by cutting-out one edge of each cross-strip being folded-back on one and the same side of this latter.

There is thus formed a plate-type fuel assembly which can be directly substituted within a reactor core for a conventional fuel-pencil assembly without entailing any particular modification of the reactor core structures which are associated with these fuel assemblies. In particular, the control rods can be permitted to pass directly through the fuel assembly itself by means of the sleeves which are added to the fuel plates. It is worthy of note that the construction of the sleeve-type fuel plates can be carried out by means of any suitable method and especially by continuous or non-continuous welding of the sleeves to the flat cladding sheets, either by spot-welding or by mechanical assembly.

What I claim is:

1. A plate-type fuel assembly for nuclear reactors comprising two vertically spaced apart support plates having aligned apertures therethrough, a stack of parallel fuel plates disposed vertically in uniformly spaced relation between said support plates, each of said fuel plates being surrounded by cladding and being joined together and maintained in position with respect to each other by connecting means which extend at right angles to the plane of the fuel plates and are disposed at intervals in the vertical direction on the lateral edges of said plates, a plurality of said fuel plates having hollow sleeves rigidly fixed thereto and extending vertically in the plane of said plates, said sleeves being uniformly spaced in the transverse direction of said plates and means for securing said fuel plates relative to said support plates with said hollow sleeves aligned with said apertures in said support plates to permit the passage of control rods through said sleeves.

2. A fuel assembly according to claim 1, wherein said sleeves which are rigidly fixed to said fuel plates have a longitudinal dimension which exceeds that of the fuel plates and are secured at the ends thereof to said support plates in alignment with said apertures.

3. A fuel assembly according to claim 1, wherein hollow tubular tie-rods are freely located in said sleeves and have a length greater than the length of said fuel plates in the vertical direction. Said tubular tie-rods being secured to said support plates in alignment with said apertures.

4. A fuel assembly according to claim 1, wherein the means for interconnecting the fuel plates of the stack are constituted by combs having teeth which are flush mounted in the cladding of said fuel plates.

5. A fuel assembly according to claim 1, wherein the means for interconnecting the fuel plates of the stack are comprised of transverse strips welded to the edges of said fuel plates.

6. A fuel assembly according to claim 1, wherein the paralled fuel plates of said stack are braced with respect to each other by means of a plurality of elongated spacers disposed between said fuel plates remote from the edges of said plates.

7. A fuel assembly according to claim 6, wherein said spacers are comprised of elongated lugs having a width equal to the spacing between adjacent fuel plates, said lugs being joined together by means of cylindrical connecting portions disposed between adjacent lugs and having a length equal to the thickness of said fuel plates.

8. A fuel assembly according to claim 7, wherein said elongated lugs traverse the fuel plates through elongated slots formed in said plates in a zone which does not contain fuel and are positioned by means of rotation through an angle of 90° in order to dispose the elongated lugs at right angles to the direction of said elongated slots.

9. A fuel assembly according to claim 1, wherein the hollow sleeves extend in a sincgle piece through the full height of said fuel plates.

10. A fuel assembly according to claim 1, wherein the hollow sleeves are constituted by spaced tubular elements secured to said fuel plate in alignment with each other.

11. A fuel assembly according to claim 1, wherein the hollow sleeves project below the bottom edge of said fuel plates from the adjacent support plate.

12. A fuel assembly according to claim 1, wherein the means for interconnecting the fuel plates are provided with extensions in the form of lateral sheet-metal strips of small thickness applied against the edges of said fuel plates in order to limit the flow of coolant which penetrates between said fuel plates.

13. A fuel assembly according to claim 1, wherein the stack of fuel plates if provided with means for inducing turbulence in the flow between said fuel plates, said means comprising thin metallic cross-strips which are located between adjacent fuel plates.

14. A fuel assembly according to claim 13, wherein each thin metallic cross-strip is provided with portions along one edge thereof folded out of the plane of said cross-strip.

* * * * *